United States Patent
Candelore et al.

(10) Patent No.: US 8,555,326 B2
(45) Date of Patent: Oct. 8, 2013

(54) DISPLAY DEVICE DETECTION OF AND RESPONSE TO AN IDLE MODE OF A REMOTE SENDER DEVICE

(75) Inventors: Brant Candelore, San Diego, CA (US); Robert N. Blanchard, Escondido, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 481 days.

(21) Appl. No.: 12/119,722

(22) Filed: May 13, 2008

(65) Prior Publication Data

US 2009/0288126 A1    Nov. 19, 2009

(51) Int. Cl.
*H04N 7/173* (2011.01)

(52) U.S. Cl.
USPC ........... 725/110; 725/112; 725/136; 348/463; 348/473; 715/716

(58) Field of Classification Search
USPC ................. 725/110, 112, 136; 348/463, 473; 715/716
See application file for complete search history.

(56) References Cited

U.S. PATENT DOCUMENTS

| | | | | |
|---|---|---|---|---|
| 5,600,366 A | * | 2/1997 | Schulman | 725/36 |
| 5,907,321 A | * | 5/1999 | Grossman et al. | 725/32 |
| 6,084,583 A | | 7/2000 | Gerszberg et al. | |
| 6,486,900 B1 | * | 11/2002 | Shen et al. | 715/867 |
| 6,701,526 B1 | * | 3/2004 | Trovato | 725/39 |
| 7,068,724 B1 | * | 6/2006 | Hamilton | 375/240.26 |
| 7,426,558 B1 | * | 9/2008 | Allibhoy et al. | 709/224 |
| 2002/0171770 A1 | * | 11/2002 | Wendt et al. | 348/634 |
| 2003/0030652 A1 | * | 2/2003 | Billmaier et al. | 345/629 |
| 2004/0117843 A1 | * | 6/2004 | Karaoguz et al. | 725/108 |
| 2005/0062888 A1 | * | 3/2005 | Wood et al. | 348/553 |
| 2006/0089935 A1 | * | 4/2006 | Clifford et al. | 707/10 |
| 2006/0117366 A1 | * | 6/2006 | Fries | 725/112 |
| 2006/0181645 A1 | * | 8/2006 | Sarika | 348/563 |
| 2007/0139353 A1 | * | 6/2007 | Tseng et al. | 345/102 |
| 2007/0256015 A1 | | 11/2007 | Matz | |
| 2008/0172702 A1 | * | 7/2008 | Kim et al. | 725/91 |
| 2008/0276268 A1 | * | 11/2008 | Harpak et al. | 725/32 |
| 2009/0158222 A1 | * | 6/2009 | Kerr et al. | 715/867 |
| 2009/0222875 A1 | * | 9/2009 | Cheng et al. | 725/147 |

FOREIGN PATENT DOCUMENTS

WO    WO9934593 A1    7/1999

* cited by examiner

*Primary Examiner* — Pankaj Kumar
*Assistant Examiner* — Sahar Baig
(74) *Attorney, Agent, or Firm* — Miller Patent Services; Jerry A. Miller (57) ABSTRACT

A method, system and apparatus provide for detection by a display device of an idle mode of a remote sender device. Information received from a remote sender device by a display device is monitored during a normal operating mode of operation of the display device to determine whether the remote sender device is not providing primary content for display by the display device, such as might occur during a sleep or idle mode of the remote sender device. If the display device determines that primary content is not being provided by the remote sender device, then the display device acquires alternate content that may be displayed.

17 Claims, 4 Drawing Sheets

DISPLAY DEVICE DETECTION OF AND RESPONSE TO AN IDLE MODE OF A REMOTE SENDER DEVICE

BACKGROUND

Many remote sender devices, such as satellite, cable or IPTV set top boxes, computers, laptops, etc., responsible for sending content for display on a display device, such as a television or monitor, will not actually shut-off while not in use. They often will instead cause a screen saver to be displayed or blank the screen. The screen saver may be nothing more than an Icon of the service that moves about the screen. They may also be text displayed to a viewer instructing them to press "select" or take another action in order to resume watching content.

In addition to such screen savers being wasteful of energy, they can also be inefficient as far as wasting an opportunity to present the viewer with information that might be considered useful or interesting.

BRIEF DESCRIPTION OF THE DRAWINGS

The features of the invention believed to be novel are set forth with particularity in the appended claims. The invention itself however, both as to organization and method of operation, together with objects and advantages thereof, may be best understood by reference to the following detailed description of the invention, which describes certain exemplary embodiments of the invention, taken in conjunction with the accompanying drawings in which:

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION

While this invention is susceptible of embodiment in many different forms, there is shown in the drawings and will herein be described in detail specific embodiments, with the understanding that the present disclosure is to be considered as an example of the principles of the invention and not intended to limit the invention to the specific embodiments shown and described. In the description below, like reference numerals are used to describe the same, similar or corresponding parts in the several views of the drawings.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

Reference throughout this document to "one embodiment", "certain embodiments", "an embodiment" or similar terms means that a particular feature, structure, or characteristic described in connection with the embodiment is included in at least one embodiment of the present invention. Thus, the appearances of such phrases or in various places throughout this specification are not necessarily all referring to the same embodiment. Furthermore, the particular features, structures, or characteristics may be combined in any suitable manner in one or more embodiments without limitation.

The term "or" as used herein is to be interpreted as an inclusive or meaning any one or any combination. Therefore, "A, B or C" means "any of the following: A; B; C; A and B; A and C; B and C; A, B and C". An exception to this definition will occur only when a combination of elements, functions, steps or acts are in some way inherently mutually exclusive.

It will be appreciated that embodiments of the invention described herein may be comprised of one or more conventional processors and unique stored program instructions that control the one or more processors to implement, in conjunction with certain non-processor circuits, some, most, or all of the functions described herein. The non-processor circuits may include, but are not limited to, a radio receiver, a radio transmitter, signal drivers, clock circuits, power source circuits, user input devices, and broadcast receivers such as televisions. As such, these functions may be interpreted as a method to perform functions such as acquisition of a new policy in accordance with certain embodiments consistent with the present invention. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

A method, system and structure provides for a display device, such as a television (TV), monitor or the like, to be able to determine when information being provided to it is not primary content, such as might occur, for instance, when a remote sender device, such as a set-top box (STB) that normally provides primary content or programming to the display device for display, stops doing so upon going into an idle or sleep mode. Whereas detection by the display device of an idle mode of the remote sender device might normally trigger the display device to simply display a screen saver, embodiments presented herein provide for the display device, subsequent to detection of no primary content from the remote device, to display alternate content during an alternate display mode of the display device. Alternately, upon detection of an idle mode of a remote sender device, the display device may switch off or disable its display element, i.e. TV screen, in order to save power.

Such alternate content may be stored internally in the display device, such as cached programming resident in memory of the display device, or it may be acquired, even in real time, from another source, remote the display device. For example, the display device may receive alternate content from a second remote sender device, such as a lap top or computer, or streaming data from the Internet over an Ethernet connection received in real time. Moreover, alternate content itself may be advertising, advertisements, as in the form of text, videos, icons, audio, etc.

Display of the alternate content may replace display of a screen saver by the display device or it may be in addition to display of a screen saver. As described herein, certain embodiments provide for display of alternate content overlaid a screen saver, and the alternate content may assume a transparent form in which the underlying screen saver is still visible to the viewer. Also, the display device may additionally provide an indication to a viewer or user that the remote sender device is in an idle mode, in combination with whatever form the alternate content is to be displayed.

Figure 1:
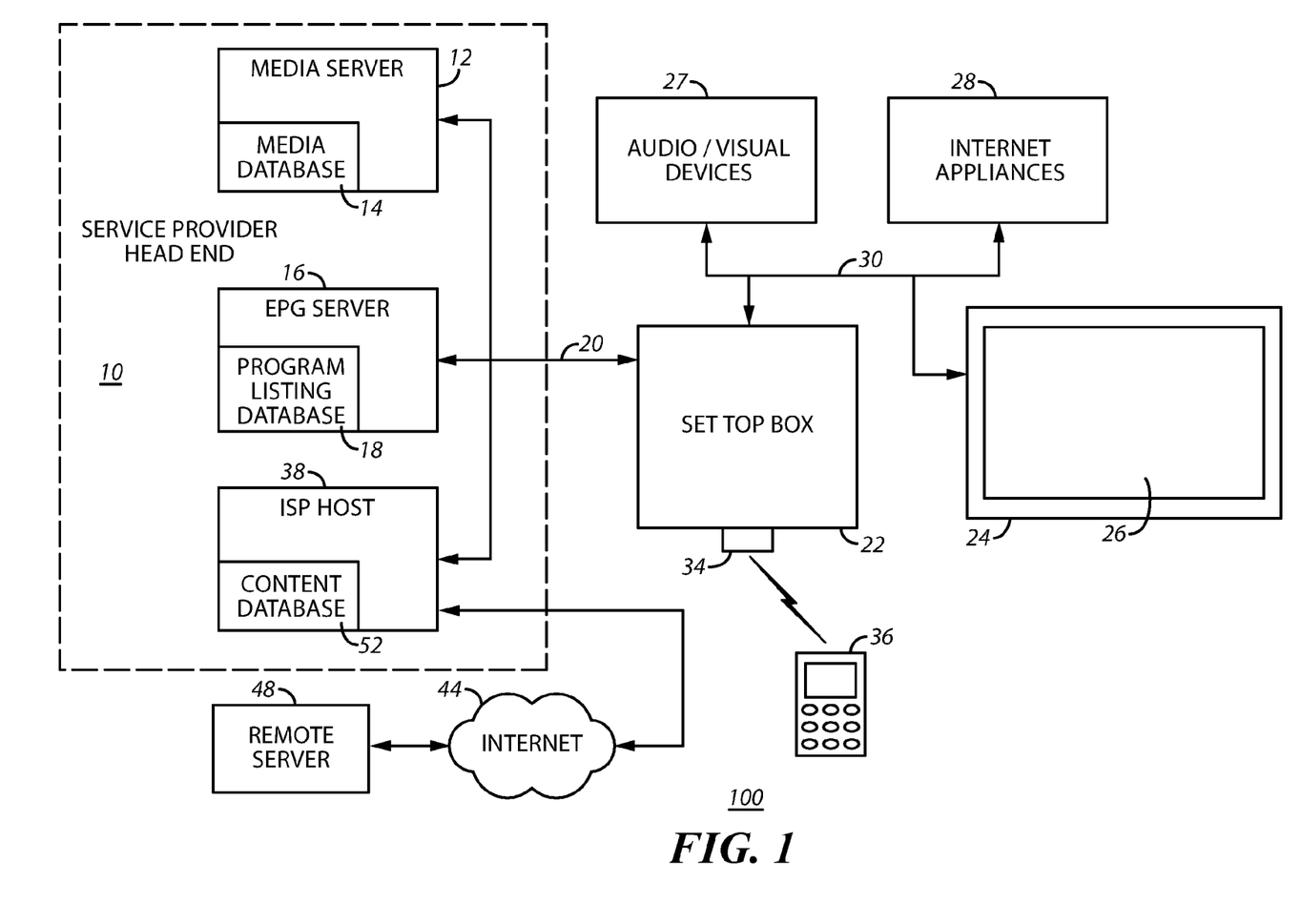
FIG. 1 is a system block diagram of a system, in accordance with various embodiments.

Referring to FIG. 1 of the drawings, a block diagram for an exemplary interactive cable or satellite television (TV) system 100 is shown. The system 100 includes, at a head end of the service provider 10, a media server 12 for providing, on demand, movies and other programming obtained from a media database 14. The media server 12 might also provide additional content such as interviews with the actors, games, advertisements, available merchandise, associated Web pages, interactive games and other related content. The system 100 also includes an electronic programming guide (EPG) server 16 and a program listing database 18 for generating an EPG. Set-top box 22 can generally provide for bidirectional communication over a transmission medium 20 in the case of a cable STB 22. In other embodiments, bidirectional communication can be effected using asymmetrical communication techniques possibly using dual communication media—one for the uplink and one for the downlink. In any event, the STB 22 can have its own Universal Resource Locator (URL) or IP address or other unique identifier assigned thereto to provide for addressability by the head end and users of the Internet.

The media server 12 and EPG server 16 are operatively coupled by transmission medium 20 to a set-top box (STB) 22. The transmission medium 20 may include, for example, a conventional coaxial cable network, a fiber optic cable network, telephone system, twisted pair, a satellite communication system, a radio frequency (RF) system, a microwave system, other wireless systems, a combination of wired and wireless systems or any of a variety of known electronic transmission mediums. In the case of a cable television network, transmission medium 20 is commonly realized at the subscriber's premises as a coaxial cable that is connected to a suitable cable connector at the rear panel of the STB 22. In the case of a Direct Satellite System (DSS), the STB 22 is often referred to as an Integrated Receiver Decoder (IRD). In the case of a DSS system, the transmission medium is a satellite transmission at an appropriate microwave band. Such transmissions are typically received by a satellite dish antenna with an integral Low Noise Block (LNB) that serves as a down-converter to convert the signal to a lower frequency for processing by the STB 22.

The exemplary system 100 further includes a TV 24, such as a digital television, having a display 26 for displaying programming, an EPG, etc. The STB 22 may be coupled to the TV 24 and various other audio/visual devices 27 (such as audio systems, Personal Video Recorders (PVRs), Video Tape Recorders (VTRs), Video Cassette Recorders (VCRs) and the like), storage devices (e.g., hard disc drives) and Internet Appliances 28 (such as email devices, home appliances, storage devices, network devices, and other Internet Enabled Appliances) by an appropriate interface 30, which can be any suitable analog or digital interface. In one embodiment, interface 30 conforms to an interface standard such as the Institute of Electrical and Electronics Engineers (IEEE) 1394 standard, but could also be wholly or partially supported by a Digital Visual Interface (DVI), High Definition Media Interface (HDMI), Ethernet. 4 or 60 giga-Hertz wireless, or other suitable interface.

The STB 22 may include a central processing unit (CPU) such as a microprocessor and memory such as Random Access Memory (RAM), Read Only Memory (ROM), flash memory, mass storage such as a hard disc drive, floppy disc drive, optical disc drive or may accommodate other electronic storage media, etc. Such memory and storage media is suitable for storing data as well as instructions for programmed processes for execution on the CPU, as will be discussed later. Information and programs stored on the electronic storage media or memory may also be transported over any suitable transmission medium such as that illustrated as 20. STB 22 may include circuitry suitable for audio decoding and processing, the decoding of video data compressed in accordance with a compression standard such as the Motion Pictures Experts Group (MPEG) standard and other processing to form a controller or central hub. Alternatively, components of the STB 22 may be incorporated into the TV 24 itself, thus eliminating the STB 22. Further, a computer having a tuner device and modem may be equivalently substituted for the TV 24 and STB 22.

By way of example, the STB 22 may be coupled to devices such as a personal computer, video cassette recorder, camcorder, digital camera, personal digital assistant and other audio/visual or Internet related devices. In addition, a data transport architecture, such as the Home Audio-Video Interoperability (HAVi) architecture may be utilized to enable interoperability among devices on a network regardless of the manufacturer of the device. This forms a home network system wherein electronic devices and Internet appliances are compatible with each other. The STB 22 runs an operating system suitable for a home network system.

The STB 22 includes an infrared (IR) receiver 34 for receiving IR signals from an input device such as remote control or commander 36. Alternatively, it is noted that many other control communication methods may be utilized besides IR, such as wired or wireless radio frequency, etc. In addition, it can be readily appreciated that the input device 36 may be any device suitable for controlling the STB 22 such as a remote control or commander, personal digital assistant, laptop computer, keyboard or computer mouse. In addition, an input device in the form of a control panel located on the TV 24 or the STB 22 can be provided.

The STB 22 may also be coupled to an independent service provider (ISP) host 38 by a suitable connection including dial-up connections, DSL (Digital Subscriber Line) or the same transmission medium 20 described above (e.g., using a cable modem) to, thus, provide access to services and content from the ISP and the Internet. The ISP host 38 provides various content to the user that is obtained from a content database 52. STB 22 may also be used as an Internet access device to obtain information and content from remote servers such as remote server 48 via the Internet 44 using host 38 operating as an Internet portal, for example. In certain satellite STB environments, the data can be downloaded at very high speed from a satellite link, with asymmetrical upload speed from the set-top box provided via a dial-up or DSL connection.

While the arrangement illustrated in FIG. 1 shows a plurality of servers and databases depicted as independent devices, any one or more of the servers can operate as server software residing on a single computer. Moreover, although not explicitly illustrated, the servers may operate in a coordinated manner under centralized or distributed control to provide multiple services as a Multiple Service Operator (MSO) in a known manner. Additionally, the services provided by the servers shown in FIG. 1 may actually reside in other locations, but from the perspective of the user of STB 22, the service provider 10 serves as a portal to the services shown. Those skilled in the art will appreciate that the illustration of FIG. 1 represents a simplified depiction of a cable system configuration shown simply as service provider 10. The actual configuration of the service provider's equipment is more likely to follow a configuration defined by the CableLabs OpenCable™ specification. The simplified illustration shown is intended to simplify the discussion of the service provider 110's operation without unnecessarily burdening the discussion with architectural details that will be evident to those skilled in the art. Those details can be found in the publicly available CableLabs OpenCable™ specification or in the text "OpenCable Architecture (Fundamentals)" by Michael Adams, Cisco Press, November 1999.

Figure 2:
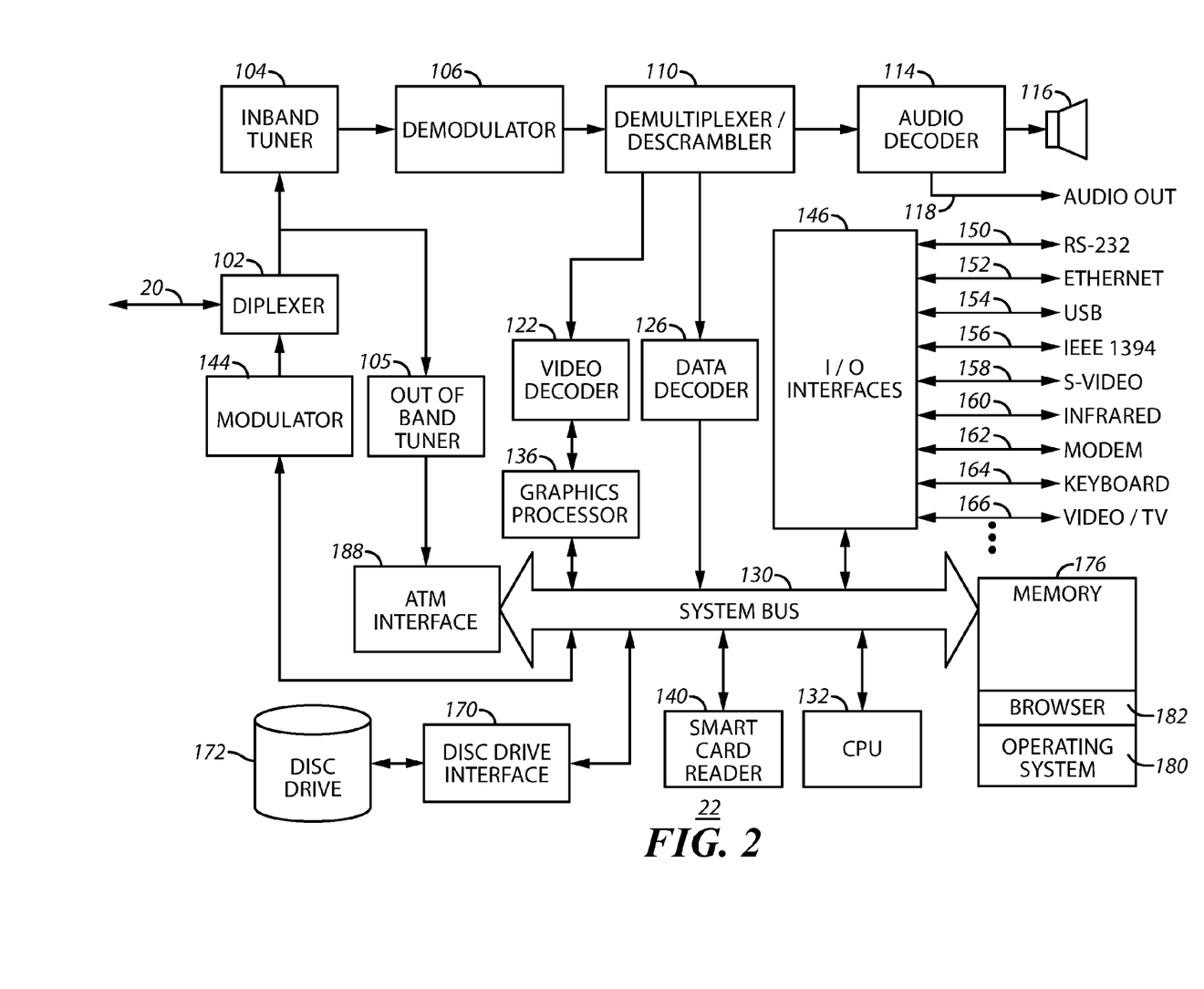
FIG. 2 is a functional block diagram of a digital set-top box, in accordance with various embodiments.

Referring now to FIG. 2, a typical system configuration for a digital set-top box 22 is illustrated. In this exemplary set-top box, the transmission medium 20, such as a coaxial cable, is coupled by a suitable interface through a diplexer 102 to an in-band tuner 104. Tuner 104 may, for example, include a broadcast in-band tuner for receiving video content. An out-of-band (OOB) tuner 105 is provided for receiving data transmissions, including ATM formatted SI data. A return path through diplexer 102 provides an OOB return path for outbound data (destined for example for the head end). A separate tuner (not shown) may be provided to receive conventional RF broadcast television channels. Modulated information formatted, for example, as MPEG-2 information is then demodulated at a demodulator 106. The demodulated information at the output of demodulator 106 is provided to a demultiplexer and descrambler circuit 110 where the information is separated into discrete channels of programming. The programming is divided into packets, each packet bearing an identifier called a Packet ID (PID) that identifies the packet as containing a particular type of data (e.g., audio, video, data). The demodulator and descrambler circuit 110 also decrypts encrypted information in accordance with a decryption algorithm to prevent unauthorized access to programming content, for example.

Audio packets from the demultiplexer 110 (those identified with an audio PID) are decrypted and forwarded to an audio decoder 114 where they may be converted to analog audio to drive a speaker system (e.g., stereo or home theater multiple channel audio systems) or other audio system 116 (e.g., stereo or home theater multiple channel amplifier and speaker systems) or may simply provide decoded audio out at 118. Video packets from the demultiplexer 110 (those identified with a video PID) are decrypted and forwarded to a video decoder 122. In a similar manner, data packets from the demultiplexer 110 (those identified with a data PID) are decrypted and forwarded to a data decoder 126.

Decoded data packets from data decoder 126 are sent to the set-top box's computer system via the system bus 130. A central processing unit (CPU) 132 can thus access the decoded data from data decoder 126 via the system bus 130.

Video data decoded by video decoder 122 is passed to a graphics processor 136, which is a computer optimized to processes graphics information rapidly. Graphics processor 136 is particularly useful in processing graphics intensive data associated with Internet browsing, gaming and multimedia applications such as those associated with MHEG (Multimedia and Hypermedia information coding Experts Group) set-top box applications. It should be noted, however, that the function of graphics processor 136 may be unnecessary in some set-top box designs having lower capabilities, and the function of the graphics processor 136 may be handled by the CPU 132 in some applications where the decoded video is passed directly from the demultiplexer 110 to a video encoder. Graphics processor 136 is also coupled to the system bus 130 and operates under the control of CPU 132.

Many set-top boxes such as STB 22 may incorporate a smart card reader 140 for communicating with a so called "smart card," often serving as a Conditional Access Module (CAM). The CAM typically includes a central processor unit (CPU) of its own along with associated RAM and ROM memory. Smart card reader 140 is used to couple the system bus of STB 22 to the smart card serving as a CAM (not shown). Such smart card based CAMs are conventionally utilized for authentication of the user and authentication of transactions carried out by the user as well as authorization of services and storage of authorized cryptography keys. For example, the CAM can be used to provide the key for decoding incoming cryptographic data for content that the CAM determines the user is authorized to receive.

STB 22 can operate in a bidirectional communication mode so that data and other information can be transmitted not only from the system's head end to the end user, or from a service provider to the end user of the STB 22, but also, from the end user upstream using an out-of-band channel. In one embodiment, such data passes through the system bus 130 to a modulator 144 through the diplexer 102 and out through the transmission medium 20. This capability is used to provide a mechanism for the STB 22 and/or its user to send information to the head end (e.g., service requests or changes, registration information, etc.) as well as to provide fast outbound communication with the Internet or other services provided at the head end to the end user.

Set-top box 22 may include any of a plurality of I/O (Input/Output) interfaces represented by I/O interfaces 146 that permit interconnection of I/O devices to the set-top box 22. By way of example, and not limitation, a serial RS-232 port 150 can be provided to enable interconnection to any suitable serial device supported by the STB 22's internal software. Similarly, communication with appropriately compatible devices can be provided via an Ethernet port 152 (wired or wireless), a USB (Universal Serial Bus) port 154, an IEEE 1394 (so-called Firewire™ or i-Link™) or IEEE 1394 wide port 156, S-video port 158 or infrared port 160, or Bluetooth. Such interfaces can be utilized to interconnect the STB 22 with any of a variety of accessory devices such as storage devices, audio/visual devices 27, gaming devices (not shown), Internet Appliances 28, etc.

I/O interfaces 146 can include a modem (be it dial-up, cable, DSL or other technology modem) having a modem port 162 to facilitate high speed or alternative access to the Internet or other data communication functions. In one preferred embodiment, modem port 162 is that of a DOCSIS (Data Over Cable System Interface Specification) cable modem to facilitate high speed network access over a cable system, and port 162 is appropriately coupled to the transmission medium 20 embodied as a coaxial cable. Thus, the STB 22 can carry out bidirectional communication via the DOC- SIS cable modem with the STB 22 being identified by a unique IP address. The DOCSIS specification is publicly available.

A PS/2 or other keyboard/mouse/joystick interface such as 164 can be provided to permit ease of data entry to the STB 22. Such inputs provide the user with the ability to easily enter data and/or navigate using pointing devices. Pointing devices such as a mouse or joystick may be used in gaming applications.

Of course, STB 22 also may incorporate basic video outputs 166 that can be used for direct connection to a television set such as 24 instead of (or in addition to) an IEEE 1394 connection such as that illustrated as 30. In one embodiment, Video output 166 can provide composite video formatted as NTSC (National Television System Committee) video. In some embodiments, the video output 166 can be provided by a direct connection to the graphics processor 136 or the demultiplexer/descrambler 110 rather than passing through the system bus 130 as illustrated in the exemplary block diagram. S-Video signals from output 158 can be similarly provided without passing through the system bus 130 if desired in other embodiments.

The infrared port 160 can be embodied as an infrared receiver 34 as illustrated in FIG. 1, to receive commands from an infrared remote control 36, infrared keyboard or other infrared control device. Although not explicitly shown, front panel controls may be used in some embodiments to directly control the operation of the STB 22 through a front panel control interface as one of interfaces 146. Selected interfaces such as those described above and others can be provided in STB 22 in various combinations as required or desired.

STB 22 will more commonly, as time goes on, include a disc drive interface 170 and disc drive mass storage 172 for user storage of content and data as well as providing storage of programs operating on CPU 132. STB 22 may also include floppy disc drives, CD ROM drives, CD R/W drives, DVD drives, etc. CPU 132, in order to operate as a computer, is coupled through the system bus 130 (or through a multiple bus architecture) to memory 176. Memory 176 may include a combination any suitable memory technology including Random Access Memory (RAM), Read Only Memory (ROM), Flash memory, Electrically Erasable Programmable Read Only Memory (EEPROM), etc.

While the above exemplary system including STB 22 is illustrative of the basic components of a digital set-top box suitable for use with the present invention, the architecture shown should not be considered limiting since many variations of the hardware configuration are possible without departing from the present invention.

Figure 3:
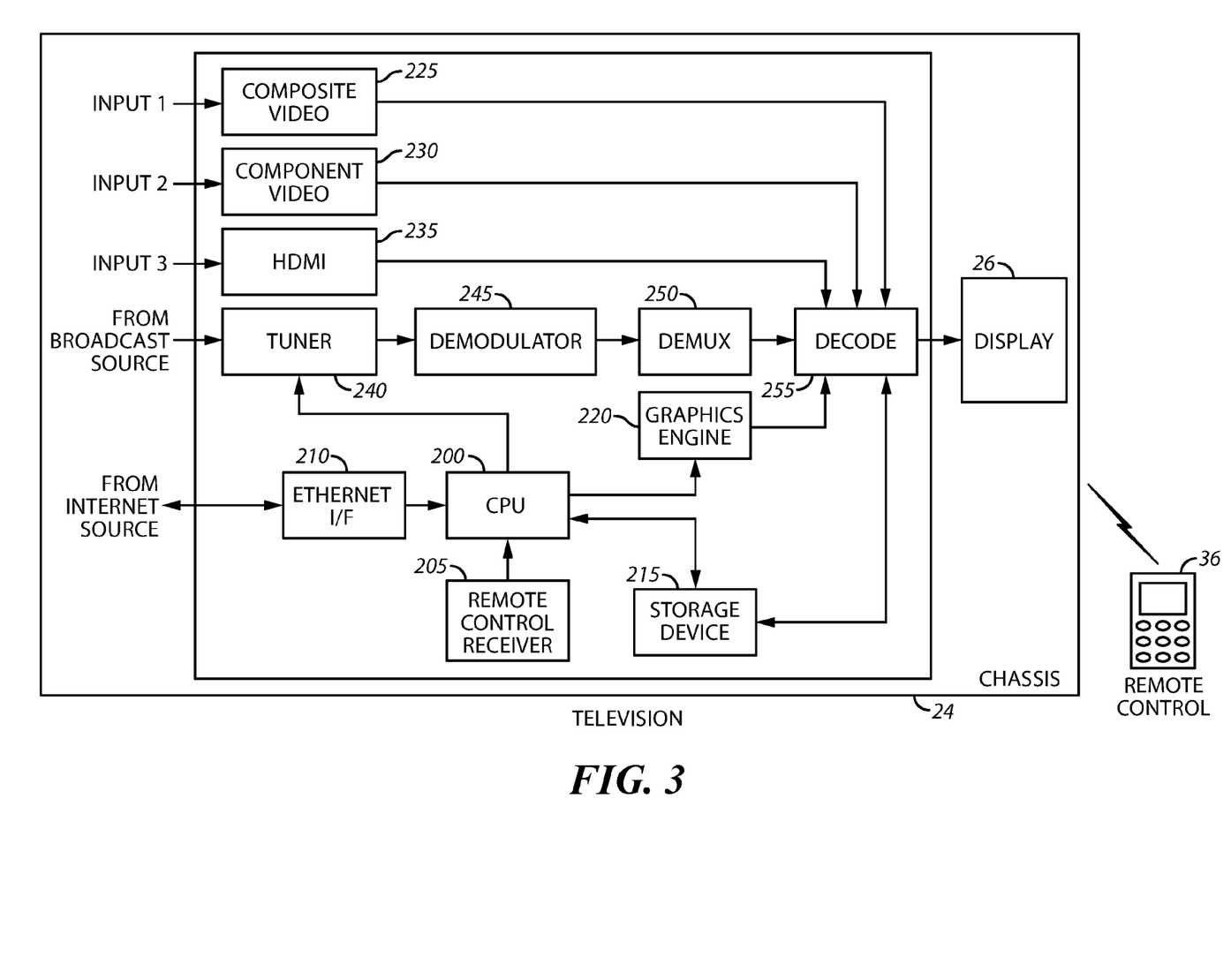
FIG. 3 is a block diagram of a display device, in accordance with various embodiments.

Referring now to FIG. 3, a block diagram of an exemplary display device, such as a television, monitor or the like, having display 26 is shown. Display device 24 has a number of components and functional elements that enable it to function. These include central processing unit or CPU 200, remote control receiver 205 for receiving communications from remote control 36, Ethernet I/F module 210, storage device 215, a graphics engine 220, composite video input module 225, component video input module 230, HDMI interface input 235, tuner 240, demodulator 245, demux 250, and decoder 255. The display device is able to communicate with the remote sender device, discussed in FIGS. 1 and 2 via remote commander/controller 36.

The exemplary display device 24 is shown as a television. A television typically will have both analog and digital inputs. Analog inputs are commonly, but not exclusively, composite and component; VGA (D-Sub-15) are applicable for analog as well. Digital interfaces may be, but not limited to, Ethernet, IEEE-1394, HDMI, and USB. Activity on any of the interfaces 225, 230, 235 can be detected by the television. For example, it is possible to detect the presence or absence of synchronization pulses in analog signals. With digital inputs, on the other hand, absence or presence of signals is detectable by absence or presence of information within the digital signal or absence of the digital signal. Many of the digital interfaces have handshaking functions that are used to detect presence of an active input or output. The television merely needs to determine whether or not any of its inputs are active through any of these or other methods.

The display device, then, is operable to display content and within the contexts of various embodiments has a programmed processor and control element 200; a receive element operable to receive information from a remote sender device (210, 225, 230, 235, 240); and a display element 26. The programmed processor and control element monitors information received by the receive element from the remote sender device and causes the display element to display the information during a normal mode of operation when the programmed processor and control element determines that the received information received from the remote sender device is primary content. When the received information is determined to be primary content, the programmed processor and control element knows that the remote sender device is not in an idle mode. When the programmed processor and control element determines that the information received by the receive element from the remote sender device is not primary content, the programmed processor and control element causes the display element to display alternate content during an alternate display mode of the display device; the programmed processor and control element may cause the display device to acquire the alternate content from a second remote sender device. The second remote sender device may reside on the Internet and the alternate content may come from the Internet over an Ethernet connection of the display device to the Internet. Alternately, when the programmed processor and control element determines that the information received by the receive element from the remote sender device is not primary content, the programmed processor and control element causes the display device to acquire the alternate content from the storage element of the display device, such as from storage device 215. The alternate content displayed by the display device may not be a screen saver content. Moreover, a screen saver function of the display device, operable to display the screen saver content, may be disabled.

As described herein, alternate content is one or more of audio, visual and audio/visual content and may come from a variety of sources, referred to as a second or secondary remote sender device or service, other than the remote sender device (such as the set top box) from which the display device receives primary content to display during a normal operating mode. It may be, for example, movies, games, videos, advertisements, etc.

During the alternate display mode of the display device, the alternate content displayed by the display device need not be a screen saver content. The screen saver function of the display device, operable to display the screen saver content, may be disabled. However, during the alternate display mode of the display device, the alternate content displayed by the display device may be overlaid a screen saver content of a screen saver function of the display device. Furthermore, the display device may display an indication of an idle mode of the remote sender device during the alternate display mode. For example, the display device may display the alternate content in a transparent form overlaid the screen saver content also displayed by the display device during the alternate display mode.

During the alternate display mode of the display device, the programmed processor and control element of the display device may cause the alternate content displayed by the display device to be overlaid a screen saver content of a screen saver function of the display device. The programmed processor and control element may cause the display device to display an indication of an idle mode of the remote sender device during the alternate display mode of the display device. For instance, the programmed processor and control element of the display device may cause the display element to display the alternate content in a transparent form overlaid the screen saver content during the alternate display mode.

With this description of display device, the system illustrated in FIG. 1 may be better understood. The remote sender device, shown as set top box 22 in the exemplary drawing, is operable to transmit primary content for display by display device 24. The display device is in cooperative arrangement with the remote sender device as shown and operable to display content from various sources. Thus, an alternate source of content may be operatively coupled to the display device. This alternate content, as previously noted, may be advertisements or any manner of programming. When the display device 24 determines that it is receiving primary content from the remote sender device 22, it displays the primary content received from the remote sender device during a normal operating mode. When the display device determines that it is not receiving primary content from the remote sender device, it can then display alternate content from the alternate source of content during an alternate display mode of operation of the display device. When the display device does not receive primary content from the remote sender device for display, this indicates that the remote sender device is in an idle mode and not providing primary content for display by the display device. The display device can determine that the remote sender device, such as a set-top box, is in a screen saver mode because, for example, most of the pixels onscreen are unchanging, indicating a relatively static screen saver being displayed. Other ways of determining whether the remote sender device is in a screen saver mode are known in the art and may be used.

Figure 4:
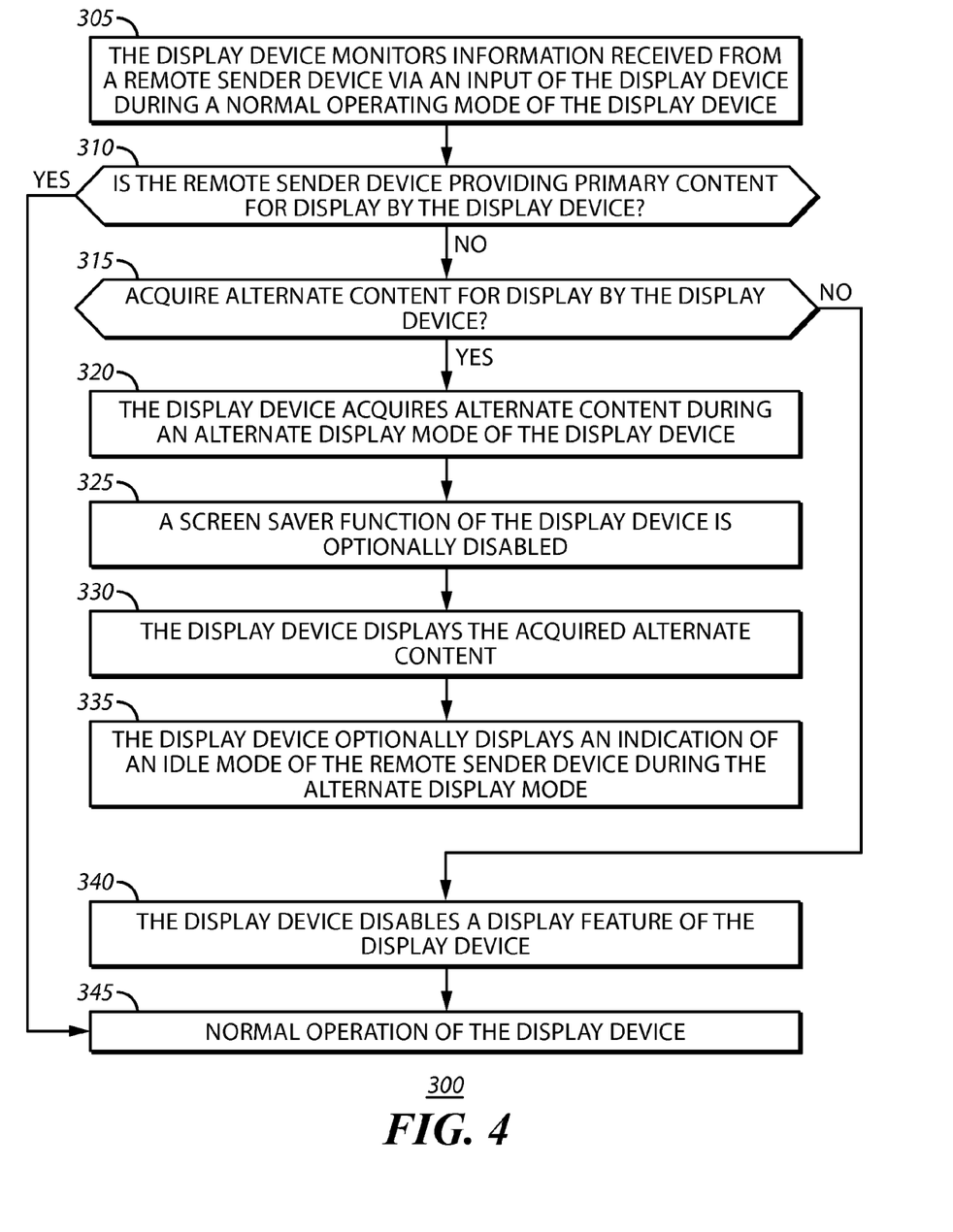
FIG. 4 is a flow diagram that illustrates detection of and response to an idle condition of a remote sender device by a display device, in accordance with various embodiments.

Referring now to flow 300 of FIG. 4, at Block 305 the display device monitors information received from a remote sender device via one or more inputs of the display device during a normal operating mode to determine whether the remote sender device is not providing primary content for display by the display device, the inquiry at Decision Block 310. As previously discussed, display devices, such as television monitors, typically may have analog and digital inputs. Analog inputs are commonly, but not exclusively, composite and component; also VGA (D-Sub-15) are applicable. Digital interfaces could be, but not limited to, DisplayPort, DVI, Ethernet, IEEE-1394, HDMI, and USB. Activity on any of the interfaces can be detected by the display device. For example, it is possible to detect the presence or absence of synchronization pulses in analog signals. With digital inputs, absence or presence of signals is detectable by absence or presence of information within the digital signal or absence of the digital signal. Many of digital interfaces have handshaking functions that are used to detect presence of an active input or output. The display device merely needs to determine whether or not any of its inputs are active.

If the display device determines from the monitored information that the remote sender device is providing primary content for display by the display device, the flow continues to Block 345 for normal, continued operation of the display device.

If, however, the display device determines from the monitored information that the remote sender device is not providing primary content for display by the display device, the flow continues to Decision Block 315 for an inquiry about whether alternate content is to be acquired for display by the display device. If no, then the flow may optionally continue to Block 340 where the display device disables a display feature of the display device. If yes, then the display device acquires alternate content during an alternate display mode of the display device at Block 320. Alternate content may be acquired through another peripheral, and optionally store such content on a hard drive or other storage device 215 for retrieval and use later. One approach is to activate another access point like Ethernet, Ethernet I/F interface 210, and stream content to the television. Or, an internal tuner 240 may be used to access a channel containing content from a broadcast source. For example, new services are available that allow for secondary programs or data access within the main channels; these are know as ancillary services or minor channels. In the future, it is expected there will be broadcast services targeted for handheld and mobile devices that would be accessible to a TV containing circuitry to receive such services. These services could contain traffic and weather information or movie trailers or sports highlights, for example. At any rate, the display device is operable to display such alternate content during an alternate display mode of the display device at Block 330.

As shown at Block 335, if the display device determines from the monitored information that the remote sender device is not providing primary content for display by the display device, the display device may disable a display feature of the display device. This may occur by turning off the display screen 26. If the display screen is a television, the television can determine if an input is active as described earlier. It is possible to program the television through the user interface to "time-out" after a period time and enter a standby state. It is also possible to have the television enter a lower power mode that disables most circuitry and still allow the receiver or inputs to listen for signals. Once a signal is received, the television could reactivate (turn on) or begin storage of the signal (content).

If the display device determines that the remote sender device is not providing primary content for display by the display device, the display device may also acquire the alternate content from a second remote sender device. The second remote sender device may reside on the Internet and the display device may receive the alternate content from the Internet over an Ethernet connection of the display device to the Internet. If the display device determines that the remote sender device is not providing primary content for display by the display device, the display device may acquire the alternate content from a storage element. As previously mentioned, the storage element may reside on the display device as shown in FIG. 3.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

What is claimed is:

1. A method for detection by and response to an idle mode of a remote sender device by a display device, comprising:
    the display device having a display and monitoring information received from a remote sender device via an input of the display device during a normal operating mode of the display device to determine whether the remote sender device is in the idle mode and not providing primary content for display by the display device while in the idle mode;
    where the remote sender device is determined to be in an idle mode by any one of:
        an absence of synchronization pulses if the remote sender device is adapted to send analog video information, and
        a presence of a screen saver signal in the video information in a digital or analog video signal;
    if the display device determines from the monitored information that the remote sender device is in the idle mode and not providing primary content for display by the display device, the display device acquiring alternate content from a second remote sender device; and
    the display device displaying the alternate content during an alternate display mode of the display device, wherein during the alternate display mode of the display device the alternate content displayed by the display device is not a screen saver content.

2. The method of claim 1, wherein if the display device determines from the monitored information that the remote sender device is not providing primary content for display by the display device, the display device disabling a display feature of the display device.

3. The method of claim 1, wherein the second remote sender device resides on the Internet and further comprising the display device receiving the alternate content from the Internet over an Ethernet connection of the display device to the Internet.

4. The method of claim 1, wherein if the display device determines that the remote sender device is not providing primary content for display by the display device, further comprising the display device acquiring the alternate content from a storage element.

5. The method of claim 4, wherein the storage element resides on the display device.

6. The method of claim 1, wherein a screen saver function of the display device, operable to display the screen saver content, is disabled.

7. The method of claim 1, wherein during the alternate display mode of the display device, the display device displaying the alternate content overlaid over a screen saver content of a screen saver function of the display device.

8. The method of claim 7, further comprising: the display device displaying an indication of the idle mode of the remote sender device during the alternate display mode.

9. The method of claim 7, wherein the display device displays the alternate content in a transparent form overlaid the screen saver content also displayed by the display device during the alternate display mode.

10. A System, comprising:
    a remote sender device operable to transmit primary content for display;
    a display device having a display, the display device in cooperative arrangement with the remote sender device and operable to display content, further comprising:
    an alternate source of content operatively coupled to the display device;
    wherein when the display device determines that the display device is receiving primary content from the remote sender device, the display device displays the primary content received from the remote sender device during a normal operating mode of the display device,
    wherein when the display device determines that the display device is not receiving primary content from the remote sender device and the remote sender device is in an idle mode during which the remote sender device does not provide primary content to the display device, the display device acquires alternate content from the alternate source of content and displays the acquired alternate content from the alternate source of content during an alternate display mode of operation of the display device, wherein during the alternate display mode of operation the alternate content displayed by the display device is not a screen saver content, and
    where the remote sender device is determined by the display device to be in an idle mode by any one of:
        an absence of synchronization pulses if the remote sender device is adapted to send analog video information, and
        a presence of a screen saver signal in the video information in a digital or analog video signal.

11. A display device operable to display content, comprising:
    a programmed processor and control element;
    a receive element operable to receive information from a remote sender device; and
    a display element;
    wherein the programmed processor and control element monitors information received by the receive element from the remote sender device and causes the display element to display the information during a normal mode of operation when the programmed processor and control element determines that the received information received from the remote sender device is primary content,
    when the programmed processor and control element determines that the information received by the receive element from the remote sender device is not primary content and the remote sender device is in an idle mode during which the remote sender device does not provide primary content to the display device, the programmed processor and control element causes the display element to acquire alternate content from a second remote sender device and display the alternate content during an alternate display mode of the display device, wherein during the alternate display mode of the display device the alternate content displayed by the display device is not a screen saver content, and
    where the remote sender device is determined by the programmed processor to be in an idle mode by any one of:
        an absence of synchronization pulses if the remote sender device is adapted to send analog video information, and
        a presence of a screen saver signal in the video information in a digital or analog video signal.

12. The device of claim 11, wherein the second remote sender device resides on the Internet and the alternate content from the Internet over an Ethernet connection of the display device to the Internet.

13. The device of claim 11, further comprising a storage element of the display device, and wherein when the programmed processor and control element determines that the information received by the receive element from the remote sender device is not primary content, the programmed processor and control element causes the display device to acquire the alternate content from the storage element of the display device.

14. The device of claim 11, wherein a screen saver function of the display device, operable to display the screen saver content, is disabled.

15. The device of claim 11, wherein during the alternate display mode of the display device, the programmed processor and control element of the display device causes the alternate content displayed by the display device to be overlaid over a screen saver content of a screen saver function of the display device.

16. The device of claim 15, further comprising: the programmed processor and control element causes the display device to display an indication of the idle mode of the remote sender device during the alternate display mode of the display device.

17. The device of claim 15, wherein the programmed processor and control element of the display device cause the display element to display the alternate content in a transparent form overlaid the screen saver content during the alternate display mode.

* * * * *